United States Patent
Dull et al.

[19]

[11] Patent Number: 6,048,199
[45] Date of Patent: Apr. 11, 2000

[54] TUNNEL KILN FOR FIRING CERAMIC HONEYCOMB BODIES

[75] Inventors: Alan T. Dull, Elmira, N.Y.; Thomas S. Hinkle, Wellsboro, Pa.

[73] Assignee: Corning Incorporated, Corning, N.Y.

[21] Appl. No.: 09/198,863

[22] Filed: Nov. 24, 1998

Related U.S. Application Data

[60] Provisional application No. 60/067,105, Dec. 2, 1997.

[51] Int. Cl.[7] ........................................ F27B 19/02
[52] U.S. Cl. .................... 432/128; 432/133; 432/171; 264/652; 264/653
[58] Field of Search ........................ 432/128, 133, 432/145, 146, 171, 192; 264/652, 653, 666

[56] References Cited

U.S. PATENT DOCUMENTS

| | | |
|---|---|---|
| 3,744,965 | 7/1973 | Remmey et al. . |
| 4,005,981 | 2/1977 | Turnbull . |
| 4,051,231 | 9/1977 | Bond et al. . |
| 4,128,394 | 12/1978 | Naito et al. . |
| 4,235,830 | 11/1980 | Bennett et al. . |
| 4,291,471 | 9/1981 | Bloom . |
| 4,340,555 | 7/1982 | Procter . |
| 4,404,166 | 9/1983 | Wiech, Jr. . |
| 4,474,731 | 10/1984 | Brownlow et al. . |
| 4,795,598 | 1/1989 | Billiet . |
| 4,884,969 | 12/1989 | Kolln et al. . |
| 4,927,577 | 5/1990 | Ohtaka et al. . |
| 4,990,086 | 2/1991 | Eustacchio . |
| 4,994,436 | 2/1991 | Giacobbe . |
| 5,044,944 | 9/1991 | Furuya et al. . |
| 5,078,929 | 1/1992 | Matsumae et al. . |
| 5,183,609 | 2/1993 | Miyahara . |
| 5,248,255 | 9/1993 | Morioka et al. . |
| 5,252,272 | 10/1993 | Yavuz et al. . |
| 5,266,027 | 11/1993 | Kuwayama . |
| 5,409,870 | 4/1995 | Locker et al. . |
| 5,419,857 | 5/1995 | Van den Sype . |

FOREIGN PATENT DOCUMENTS

| | | |
|---|---|---|
| 10-274484 | of 1998 | Japan . |
| 10-274486 | of 1998 | Japan . |

OTHER PUBLICATIONS

"Retrofitting Tunnel Kilns", The American Ceramic Society Bulletin, J.J. Lukacs, pp. 48–52.
"Pulse/Proportional Jet Firing at Work", Ceramic Industry, Carboy et al.
"Jet Firing with Pulse/Proportional Control", American Ceramic Society Bulletin, vol. 73, No. 3, Mar. 1994, pp. 93–96.

Primary Examiner—Denise L. Ferensic
Assistant Examiner—Gregory A. Wilson
Attorney, Agent, or Firm—Timothy M. Schaeberle

[57] ABSTRACT

A tunnel kiln for firing ceramic honeycomb structural body comprising a vestibule region, a carbonaceous material release region located downstream of the vestibule region and a sintering region located downstream of the carbonaceous material release region and having a multiplicity of kiln cars adapted to convey materials to be fired through the kiln. A gas distribution system is provided which includes a series of conduits each which operatively communicates with an injection site which operatively communicates with the interior of the release region for introducing a gas into the carbonaceous release region. The injection sites include a combustion burner located site, a vestibule located site, an undercar located site, a rooftop located site, and a sidewall located site or combinations thereof.

6 Claims, 4 Drawing Sheets

TUNNEL KILN FOR FIRING CERAMIC HONEYCOMB BODIES

This application claims the benefit of U.S. Provisional Application No. 60/067,105, filed Dec. 2, 1997, entitled TUNNEL KILN FOR FIRING CERAMIC HONEYCOMB BODIES, by Alan T. Dull and Thomas S. Hinkle.

The present invention relates to a firing kiln adapted for firing cellular ceramic bodies, and more particularly, it relates to a firing kiln adapted for firing cellular ceramic bodies exhibiting problematic high-organic containing batches.

BACKGROUND OF THE INVENTION

Ceramic products of a honeycomb shape, or ceramic honeycomb structures, i.e., cellular ceramic bodies, have been made by preparing a ceramic green body through mixing of ceramic materials with water and various carbonaceous materials, including extrusion and forming aids to form a plasticized batch, forming the body into a honeycomb-shaped ceramic green body through extrusion of the plasticized batch, and finally firing the honeycomb-shaped ceramic green body in a firing furnace at a predetermined temperature.

Extrusion and forming aids used in the above firing of the honeycomb structure include, specifically, organic binders and plasticizers and lubricants, such as methylcelloluse, carboxymethlcellulose, polyvinyl alcohol, alkali stearates and the like. Furthermore, other carbonaceous materials such as graphite have been included in the batch as a pore-forming agent.

It is known that the carbonaceous material release or the decomposition of the carbonaceous material, is an oxidation or exothermic reaction which releases large amounts of heat. Initially the exothermic reaction occurs at the skin or outer portion of the part, resulting in an initial thermal differential whereby the outer portion of the ceramic body is hotter than the core. Subsequently, the skin or outer portion exothermic reaction dies down, and the exothermic reaction region moves into the interior of the ware. Because typical substrates are comprised of ceramic materials, for example cordierite, which are good insulators, and exhibit a cellular structure comprising numerous channels, difficulties are encountered in effectively removing, either by conduction or convection, the heat from the ceramic body. Additionally, due to the cellular structure there is considerable surface area to promote binder reaction with the $O_2$ in the firing atmosphere, thus exacerbating this interior exothermic effect. As such, during the carbonaceous material release, the ceramic body exhibits either a positive or negative thermal differential; i.e., the core of the ceramic body exhibiting either a higher or lower temperature than that of the ceramic at/near the surface. This exothermic reaction, which occurs in the 100 to 600° C. temperature range for carbonaceous materials such as an organic binder or the like, or in the 500–1000° C. temperature range if the body contains, for example, graphite, causes a significant temperature differential between the inside and outside of the part. This temperature differential in the part creates stresses in the ceramic body which may result in cracking of the part. This phenomenon is particularly true for large cellular ceramic parts or parts containing large amounts of organic materials.

Techniques for controlling and inhibiting the thermal differential and resultant crack development are well known. One technique involves reducing burner flame temperature by using excess air for burner combustion, resulting in a reduced flame to product temperature gradient and corresponding slower ware heating rates. However, the high excess air yields an undesirably high percentage oxygen-containing atmosphere that reacts with the organics thereby accelerating release and increasing the internal exothermic reaction. As such, minimization of the thermal differential which develops during organic release, must be accomplished through very slow firing schedules or, alternatively, firing schedules which are carefully matched to the particular ware in the kiln.

Use of atmosphere control in periodic-type kilns to affect carbonaceous material release is generally known. See, for example, U.S. Pat. Nos., 4,404,166 (Wiech, Jr.), 4,474,731 (Brownlow et al.), 4,661,315 (Wiech Jr. et al.) and 4,927,577 (Ohtaka et al.). Although these methods have been shown to be effective enough for use in periodic-type kilns, they are not generally considered to be effective in tunnel kilns due to the considerable influx of ambient air (20.9% oxygen) into the firing atmosphere.

The use of pulse firing technology as a substitute for proportional firing has also been disclosed as a method for controlling and inhibiting thermal gradients in periodic kilns. Pulse firing involves the use of either high fire or low fire burner output conditions only, and produces low heating rates without the use of considerable amounts of excess air (oxygen); see, for example Eur. Pat. Appl. No. 0 709 638 which discloses a method of firing ceramic formed bodies using a furnace having burners which alternate from a high to a low output firing state. Although the use of this firing technology has been somewhat effective in periodic kilns, resulting in a reduction in the incidences of cracking, this pulse firing technique poses difficulties when used in tunnel kilns. Due to the open nature of tunnel kilns it is necessary to control the ambient air ingress into the organic release zones of the kiln by other means.

Therefore, an object of the invention is to solve the above-mentioned problems of the prior art by providing an improved tunnel kiln for use in firing high-quality crack-free ceramic honeycomb structural bodies.

SUMMARY OF THE INVENTION

It is an object of the present invention to eliminate the above-mentioned problems, and to provide a tunnel kiln for firing ceramic honeycomb structural bodies, capable of maintaining a shorter firing cycle and a reduced thermal gradient between the inner and outer portions of the green honeycomb structural bodies, thereby permitting the production of ceramic honeycomb structural bodies exhibiting less cracks.

The tunnel kiln for firing ceramic honeycomb structural bodies according to the present invention comprises a vestibule region, a carbonaceous material release region located downstream of the vestibule region and a sintering region located downstream of the carbonaceous material release region. The kiln includes a multiplicity of kiln cars adapted to convey materials to be fired through the kiln. Unique to this kiln is a gas distribution and introduction system having a plurality of introduction sites each capable of conveying and introducing a low oxygen content gas, comprising less than about 20% $O_2$, into firing atmosphere of the carbonaceous release region of the kiln.

In the above process, since the kiln is designed to allow for the gas to be conveyed and introduced thereby replacing the high $O_2$ atmosphere in the release region, the firing process utilizing this kiln results in a lessened thermal differential between the ceramic green body skin and core.

In other words, the kiln is better adapted to produce fired ceramic honeycomb bodies exhibiting far less thermal deformation and cracking.

BRIEF DESCRIPTION OF THE FIGURES

For a better understanding of the invention, reference is made to the attached drawings, wherein.

DETAILED DESCRIPTION OF THE INVENTION

Figure 1:
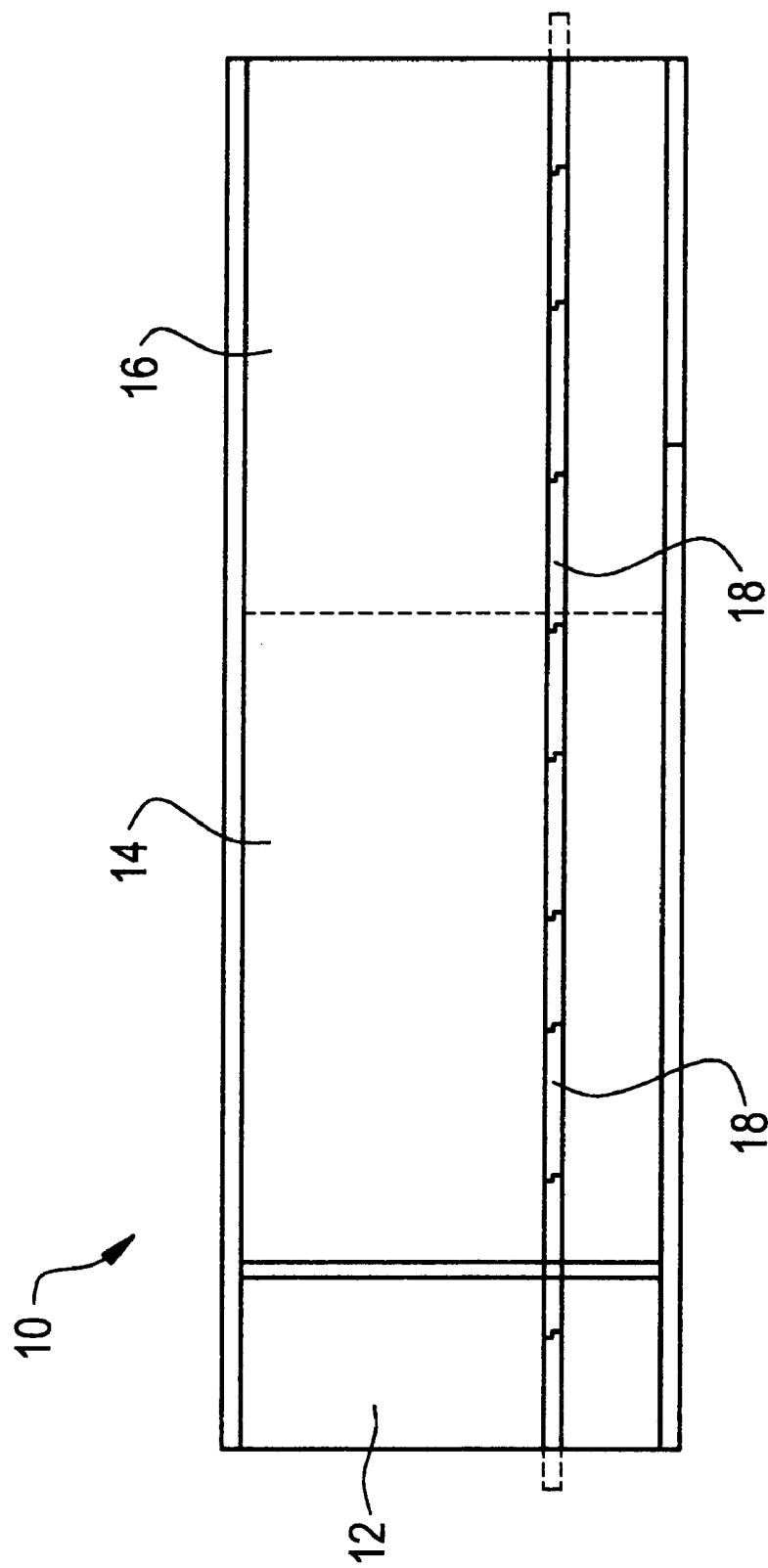
FIG. 1 is a longitudinal view of a tunnel kiln apparatus according to the present invention.

This invention provides a kiln apparatus for firing honeycomb ceramic structural bodies, substantially free of any detrimental effects as a result of the release of the carbonaceous material. FIG. 1 is a longitudinal schematic view illustrating an embodiment of the tunnel kiln according to the present invention. In this embodiment, the tunnel kiln 10 comprises a vestibule region 12, carbonaceous material release region 14, located downstream of the vestibule region, and sintering region 16, located downstream of the release region. The inside of the kiln of FIG. 1 is heated by a plurality of heaters (not shown), such as series of combustion burners capable of firing green ceramic honeycomb structural bodies. Ceramic honeycomb bodies are placed on a multiplicity of kiln cars 18 adapted to convey the materials to be fired through the kiln.

Figure 2:
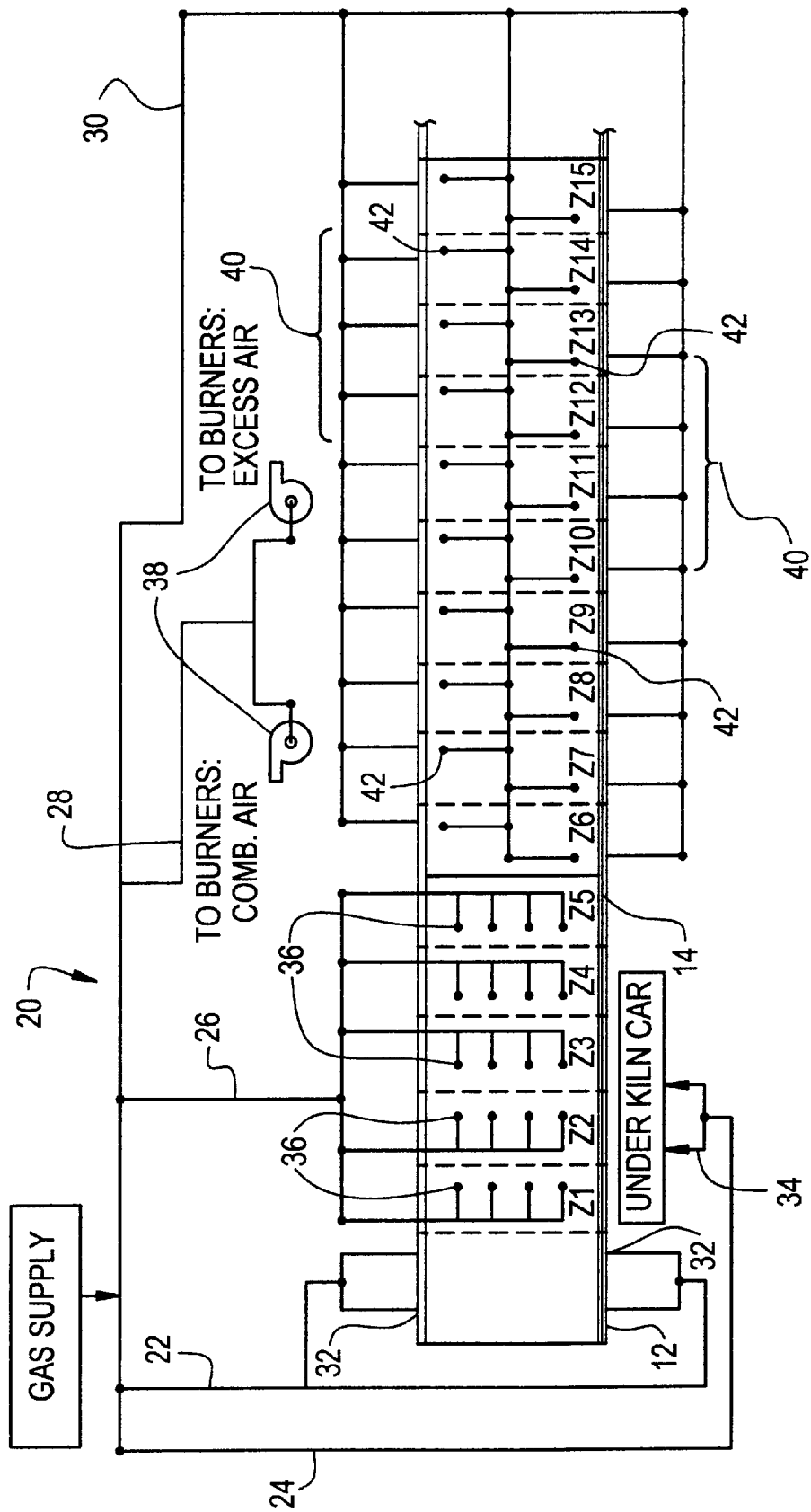
FIG. 2 is a schematic top view illustrating the tunnel kiln apparatus according to the present invention.

Referring now to FIG. 2, specifically illustrated is a top view schematic of the release 14 and vestibule 12 regions of the tunnel kiln. The tunnel kiln further includes a distribution system 20 for introducing into the release region 14, a low oxygen content gas, preferably a gas comprising less than about 20%, by volume, oxygen; also the distribution system 20 is configured to introduce or inject the gas into the vestibule region 12. The release region 14 encompasses the carbonaceous release of a defined temperature range; e.g., 100–600° C. for ceramic bodies which comprise an organic binder. The temperature range of the release region can be increased or decreased depending on the type of ceramic material to be fired by the tunnel kiln; e.g., for a ceramic material which contains graphite, in addition to an organic binder, the temperature range of the release region would be increased (up to 1000° C.).

Generally, the distribution system of the tunnel kiln comprises a series of independently metered, individually piped delivery conduits each of which operatively communicates with at least one injection sites which, in turn operatively communicates with the interior of the tunnel kiln's carbonaceous material release region and or vestibule region. It is through these conduits and communicating injection sites that a low-oxygen content gas can be introduced into the firing atmosphere of the carbonaceous release region so as to reduce the amount of oxygen present in the firing atmosphere of that region. The injection sites, designed to communicate with the interior of the tunnel kiln, in the release region are located, in one, or a combination of the following locations: under the kiln cars, in the combustion burner, in the kiln rooftop, or the kiln sidewall.

Referring still to FIG. 2, a preferred embodiment of the distribution system is shown. The distribution system 20 comprises a series of conduits 22, 24, 26, 28, and 30 having a plurality of injection sites each of which communicates with the release region in a designated single location; i.e., separate conduits each with a plurality of injection sites located in the same general location. Specifically, the distribution system comprises the following: (1) a conduit 22 with injection locations in the vestibule 32; (2) a conduit 24 with undercar located injection sites 34; (3) a conduit 26 with injection sites located in the entrance portion kiln roof 36; (4) a conduit 28 with injection sites located in the burner 38; and, (5) a conduit 30 with injection sites located in both kiln sidewall 40 and the downstream kiln roof 42.

In another embodiment (not shown), the distribution system can comprise a plurality of conduits having a plurality of injection sites each of which communicates with the release region in a combination of different locations; i.e., each conduit having associated injection sites in each of the burner, undercar, kiln roof and kiln sidewall locations.

The actual design of the distribution system, the number of conduits and injection site locations for each design type, is based on the composition, size and shape of the ceramic body, the ware load, and the size of the cell wall and number of cells exhibited by the ceramic body, and the firing schedule utilized.

One advantage of this inventive tunnel kiln configuration is the flexibility allowed in the control of the oxygen level in the firing atmosphere. Typically, the oxygen level in the carbonaceous material release region of conventional tunnel kilns is known to exceed 12% oxygen, which has been deemed as problematic because of the high rate of cracking of the fired product. This apparatus, as designed, allows for the control of the oxygen levels in this carbonaceous material release region so as to be reduced to less than 12% oxygen. Furthermore, the inventive tunnel kiln apparatus allows for the independent adjustment of gas levels in each of the conduits and thus independent adjustment of the gas inputted through the injection sites so that the firing atmosphere profile can be tailored to provide the most suitable firing atmosphere profile for a variety of organic batches. In other words, these independent delivery conduits and injection sites allow for the controlled and metered input of the low oxygen content gas as needed; the oxygen level and firing atmosphere being empirically determined and dependent upon the type or composition of the ceramic body being fired.

Figure 3:
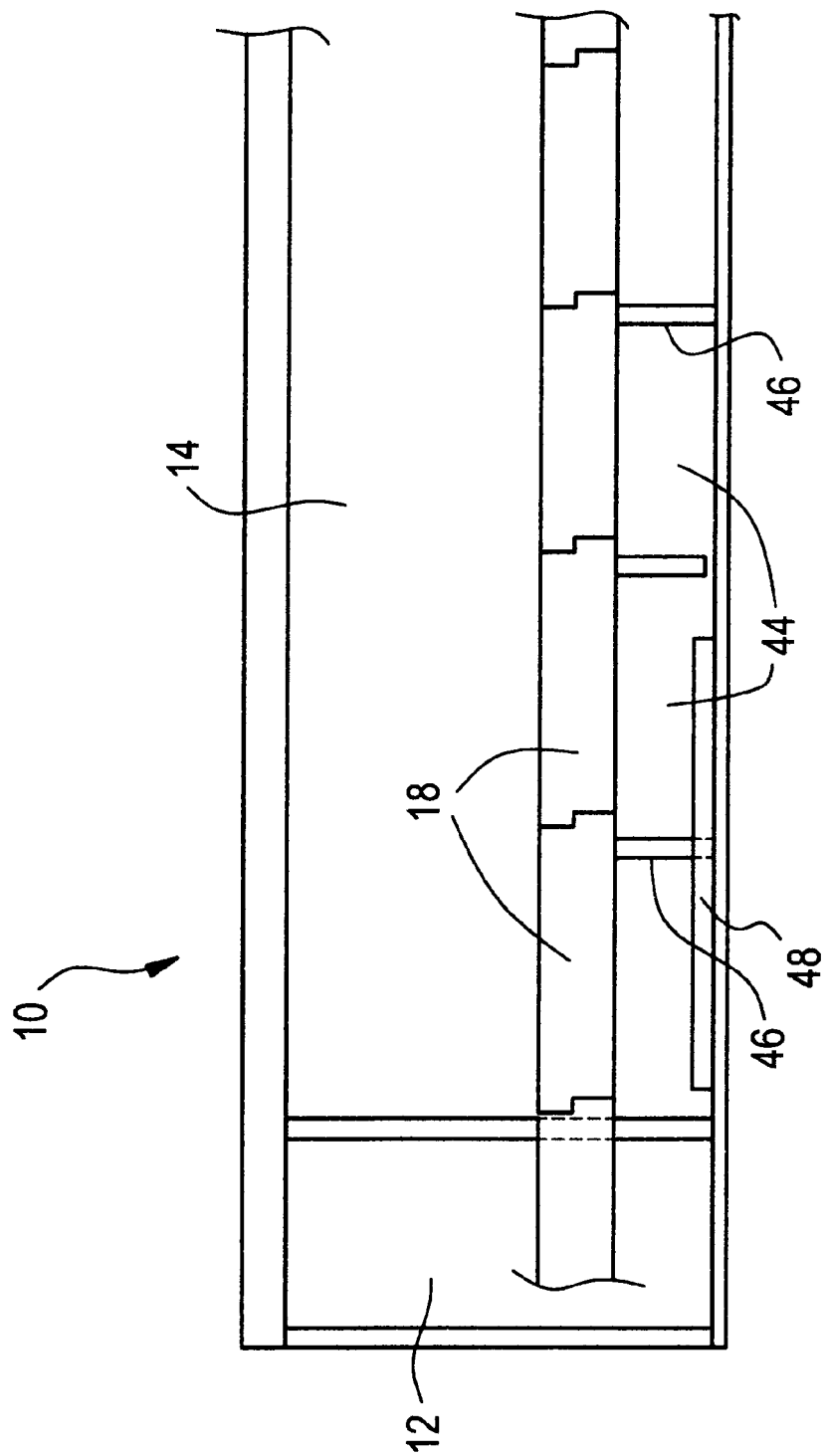
FIG. 3 is a schematic view illustrating the undercar chamber design of the release region of the tunnel kiln apparatus according to the present invention.
Figure 4:
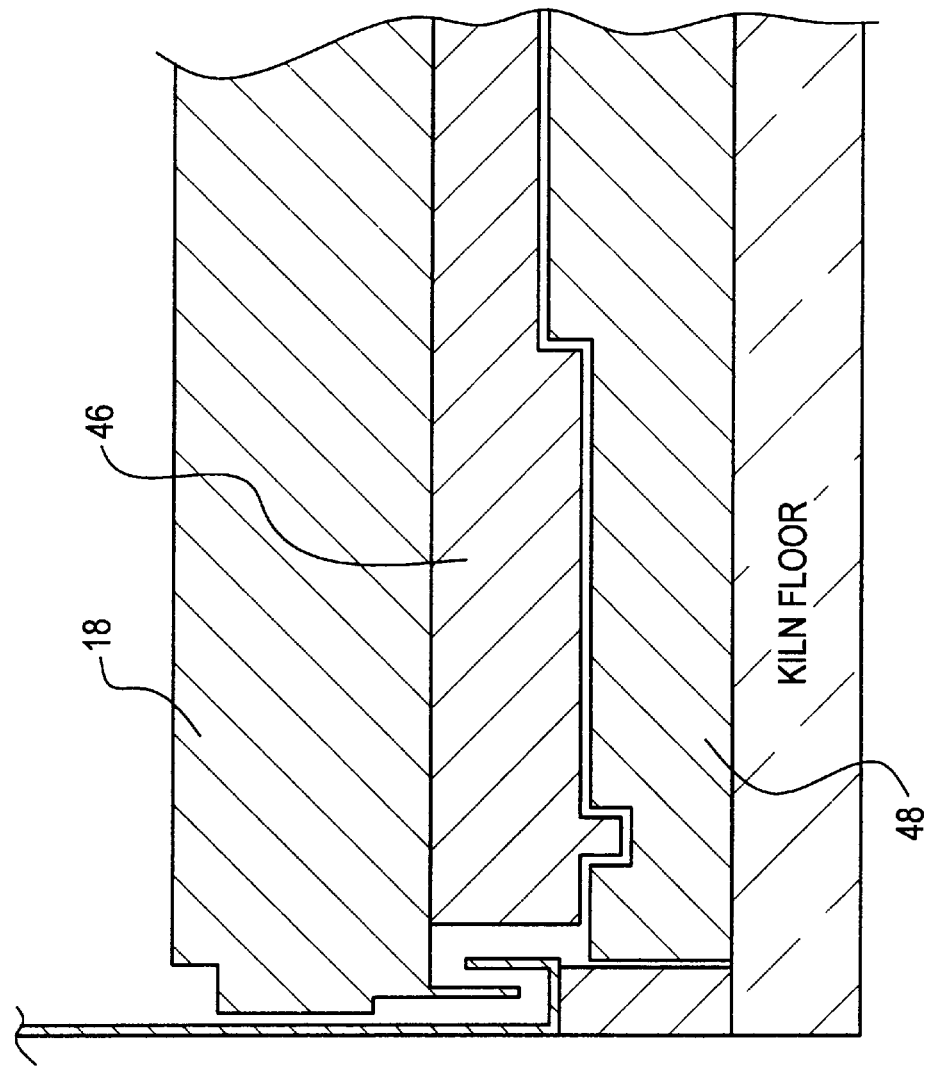
FIG. 4 is a transverse sectional view illustrating the undercar chamber design of the release region of the tunnel kiln apparatus according to the present invention

FIGS. 3 and 4 illustrate, in more detail, the undercar injection site region. A preferred embodiment includes incorporating into the kiln, under the multiple kiln cars 18 and in operative communication with the undercar located injection 24 site and conduit 34, a baffled "chamber" 44. The "chamber" 44 is formed under the kiln car by locating a lateral plate 46 on the underneath side of each kiln car 18 and positioning a floor baffle 48 at or near the kiln entrance, so that as each successive car passes through the kiln it passes over floor baffle 48. The kiln floor baffle extends over at least one and one-half, and preferably more than two, car lengths; e.g., if the distance between kiln car lateral plates is 5 feet, then it is preferred that the floor baffle extend at least than 10 feet. A floor baffle of this proportion ensures that there are always at least two car baffles positioned over the floor baffle to form a "seal" at all times.

Regarding the undercar introduction site: the better the design of the chamber configuration and baffle system, the better the seal this undercar chamber will exhibit.

Specifically, the design of this chamber configuration should be such that the space between the kiln car baffle plate and the floor baffle is minimized; i.e., a floor baffle which is designed (length and shape) so that as the car baffles pass over the floor baffle they slidably contact the floor baffle. This ensures that the open area between these two seal elements is kept as small as possible thereby minimizing the volume of gas required introduced into the "chamber".

Referring now to vestibule region as shown in FIG. 2; i.e., the region located between the inner and outer doors at the entrance to the tunnel kiln, the vestibule injection conduit 22 operatively communicates with two sets of two injection sites 32 which comprise injection nozzles located opposite each other on the kiln vestibule sidewall. These nozzles can be operated independently or in conjunction with one another.

Referring now to the combustion introduction site 38 as shown in FIG. 2, these sites can comprise either operative communication directly with the combustion air or with a separate excess air fan(s) associated with each burner; specifically those burners, and the combustion air source associated therewith, located in the release region of the kiln and encompassing the firing temperature range of between about 100 to 600° C.

Referring now to the entrance kiln roof injection sites 36 as shown in FIG. 2, the conduit 26 is in simple communication with a series of injection nozzles 36; preferably, these kiln roof site nozzles are placed in the beginning portion of the release region. In a preferred embodiment, a plurality of the roof injection nozzles are located in front portion of the release region and comprise 5 zones of four injection nozzles arranged laterally across the rooftop; this is shown as zones 1–5 in FIG. 2 (z1–z5). In the area where roof recirculation fans are located, one nozzle is positioned behind each fan, and in the zones with no fans, the nozzles are located evenly spaced and on the same plane, across the roof of the zone. The roof conduit 26 possesses a pressure control device, which is capable of controlling the overall delivered volume, while each individual nozzle exhibits a balance control system, allowing for individual control for each of the nozzles. This design provides additional flexibility in the introduction of the gas thereby ensuring that variable and predetermined levels of the gas can be delivered to the firing atmosphere so that the proper firing atmosphere can be maintained in the release region.

An additional series of downstream rooftop sites 42 operatively communicate with a conduit 30, and are provided in the downstream portion of the release region. Preferably, the configuration comprises 10 zones each comprising two rooftop located nozzles spaced alternate each other shown as zones 6 through 15 (z6–z15). These roof nozzles are located at a position on the roof just above each top firing burner (not shown), proximate the sidewall of the tunnel kiln.

Referring now to the side wall introduction sites 40, the sidewall sites operatively communicate with the same conduit 30 as the downstream located rooftop sites. These sidewall sites, specifically comprise nozzles located at the same point as that location of the top firing sidewall burners (not shown).

As before, the conduit 30 for the downstream rooftop and sidewall sites are provided with a pressure control device, which controls the overall delivered volume, and a balance control system, which allows individual control for each of the rooftop and sidewall nozzles. These sidewall and rooftop nozzles allow for individual control of the gas which is to be introduced in each of the zones in which they are located, again providing flexibility in the control of the firing atmosphere maintained in the latter portion of the release region.

This tunnel kiln is especially useful for carrying out the firing process according to the invention disclosed in co-pending, co-assigned, U.S. Prov Patent App. Ser. No. 60/067,154; a method suitable for firing cellular ceramic bodies exhibiting problematic, high-organic containing batches. Generally, that method described, comprises firing a green ceramic honeycomb structural body containing an organic or carbonaceous material and is characterized by an improved carbonaceous material release step. More specifically, the release step comprises firing the green honeycomb structural body in a firing atmosphere to a temperature and for a time sufficient to initiate and sufficiently achieve release of the carbonaceous material while introducing or injecting into the firing atmosphere a fluorine-free gas comprising less than about 20% oxygen. Once the carbonaceous material is sufficiently released, the body can be further fired conventionally for a time and a temperature sufficient to initiate and sufficiently achieve the conversion of the green ceramic honeycomb structural body into a fired honeycomb body. Preferably, the gas comprises nitrogen introduced at a rate such that the $O_2$ present in the firing atmosphere in an amount less than about 12%.

The inventive tunnel kiln described above is suitable for use to fire any ceramic material which may be detrimentally affected by uncontrolled carbonaceous material release and should not be subjected to high oxygen content atmospheres during said release. Typical ceramic materials include, for example, and without limitation, cordierite and alumina-containing ceramics.

As an example of suitable operation utilizing the inventive kiln and the method detailed in the aforementioned firing method is as follows. A nitrogen-rich atmosphere is supplied to the vestibule zone and zones 2–12 of the tunnel kiln release region illustrated in FIG. 2; the tunnel kiln release region has been divided up into 15 zones. The amounts (in cubic feet per hour; cfh) of nitrogen introduced to the vestibule region, the release region zones 2 and 3, via the undercar introduction sites, release region zone 5 via a rooftop nozzle introduction, and release region zones 6–12 also via a simple rooftop nozzle, are listed in Table I. Introduced, via the distribution system, was a nitrogen-rich atmosphere, specifically comprising a 97.0% nitrogen gas atmosphere, and generated by passing ambient air through an oxygen separator membrane. TABLE I also reports the average oxygen percent present in each of the carbonaceous material release zones (1–15) as a result of the nitrogen introduction; these oxygen levels are representative of the oxygen levels which would be suitable for producing fired ceramic bodies exhibiting far less thermal deformation and cracking.

TABLE I

| Nitrogen Introduction Site | Injection Port Location | Firing Trial 1 Nitrogen Introduction (cfh) | $O_2$ % |
|---|---|---|---|
| Vestibule | Vestibule | 10,000 | 12.9 |
| Zones 2 and 3 | Undercar | 5,000 | 12.0 |
| Zone 5 | Crown Fan | 4,000 | 10.1 |
| Zone 6 | Rooftop | 2,000 | — |
| Zone 7 | Rooftop | 2,000 | 8.4 |
| Zone 8 | Rooftop | 2,000 | — |
| Zone 9 | Rooftop | 2,000 | 11.1 |
| Zone 10 | Rooftop | 2,000 | — |
| Zone 11 | Rooftop | 2,000 | 12.0 |

TABLE I-continued

| Nitrogen Introduction Site | Injection Port Location | Firing Trial 1 Nitrogen Introduction (cfh) | $O_2$ % |
|---|---|---|---|
| Zone 12 | Rooftop | 2,000 | — |
| Zone 13 | | | 13.8 |
| Zone 15 | | | 12.8 |

It is noted that while the above invention has been described in relation to its preferred embodiments, it is to be understood that various modifications thereof will be apparent to one skilled in the art from the study of this specification and it is intended to cover such modifications as fall within the scope of the appended claims. For example various nozzle shapes to influence distribution and mixing of the introduced gases and the use of different types of low (or no) oxygen containing gases are deemed to be within the scope of this invention.

We claim:

1. A tunnel kiln for firing ceramic honeycomb structural body comprising:

a vestibule region, a carbonaceous material release region located downstream of the vestibule region and a sintering region located downstream of the carbonaceous material release region;

a multiplicity of kiln cars adapted to convey materials to be fired through the kiln;

a gas distribution system for introducing a low oxygen containing gas comprising less than about 20% $O_2$ into the carbonaceous release or vestibule region.

2. The tunnel kiln of claim 1 wherein the gas distribution system includes a series of conduits each which operatively communicates with an injection site which operatively communicates with the interior of the release region.

3. The tunnel kiln of claim 2 wherein the injection sites include a combustion burner site, an undercar site, a rooftop-located site, sidewall site OR a combinations thereof.

4. The tunnel kiln of claim 1 including a conduit which operatively communicates with an injection site which operatively communicates with the vestibule region.

5. The tunnel kiln of claim 1 wherein the undercar site operatively communicates with a baffled chamber located under the kiln cars and within the carbonaceous material release region.

6. The tunnel kiln of claim 1 wherein the low oxygen gas is nitrogen or $CO_2$ enriched.

* * * * *